United States Patent [19]

Reboul et al.

[11] Patent Number: 4,897,963
[45] Date of Patent: Feb. 6, 1990

[54] CONNECTOR DEVICE FOR TWO REACTOR CONTAINMENTS

[75] Inventors: Michel Reboul, Laudun; Charles Glachet, Vendome, both of France

[73] Assignees: Commissariat A L'Energie Atomique, Paris; Euritech, Vendome, both of France

[21] Appl. No.: 252,923

[22] Filed: Oct. 4, 1988

[30] Foreign Application Priority Data

Oct. 15, 1987 [FR] France .............................. 87 14250

[51] Int. Cl.$^4$ .......................... G21C 19/00; G21F 7/00
[52] U.S. Cl. ...................................... 49/507; 376/203; 414/146; 414/217; 414/411; 277/12; 285/325; 285/901
[58] Field of Search ............... 376/203, 204, 205, 272, 376/260; 49/61, 103, 507; 277/12; 52/173 DS; 414/146, 217, 292, 403, 411; 220/256; 285/325, 901; 250/505.1, 506.1, 507.1

[56] References Cited

U.S. PATENT DOCUMENTS

| 4,201,310 | 5/1980 | Glachet | 220/256 |
| 4,208,055 | 6/1980 | Noensie et al. | 277/12 |
| 4,260,312 | 4/1981 | Hackney | 414/292 |
| 4,747,601 | 5/1988 | Glachet | 277/12 |

FOREIGN PATENT DOCUMENTS

| 1500680 | 4/1969 | Fed. Rep. of Germany . |
| 3114150 | 10/1982 | Fed. Rep. of Germany . |
| 1357712 | 3/1964 | France . |
| 2560710 | 9/1985 | France . |
| 2573909 | 5/1986 | France . |
| 0866902 | 5/1961 | United Kingdom . |
| 1130273 | 10/1968 | United Kingdom . |

Primary Examiner—Daniel Wasil
Attorney, Agent, or Firm—Kerkam, Stowell, Kondracki & Clarke

[57] ABSTRACT

In order to place in sealed communication two reactor containments provided with openings capable of having a displacement between their axes, an assembly (12) is placed between the flanges ($B_1$, $B_2$) delimiting these openings, said assembly comprising two mobile linking parts (30a, 30b) according to a common axis, these parts bearing lip seals (36a, 36b) coming to take sealed support on the flanges under the action of a control (52) and springs (44) mechanism. Two double doors (14a, 14b) can be placed inside the openings and the linking parts in order to ensure separation of the containments. These double doors are formed of doors (16a, 18a, 16b, 18b) interconnected by means of magnets (62a, 64a, 62b, 64b) authorizing a certain relative sliding.

14 Claims, 6 Drawing Sheets

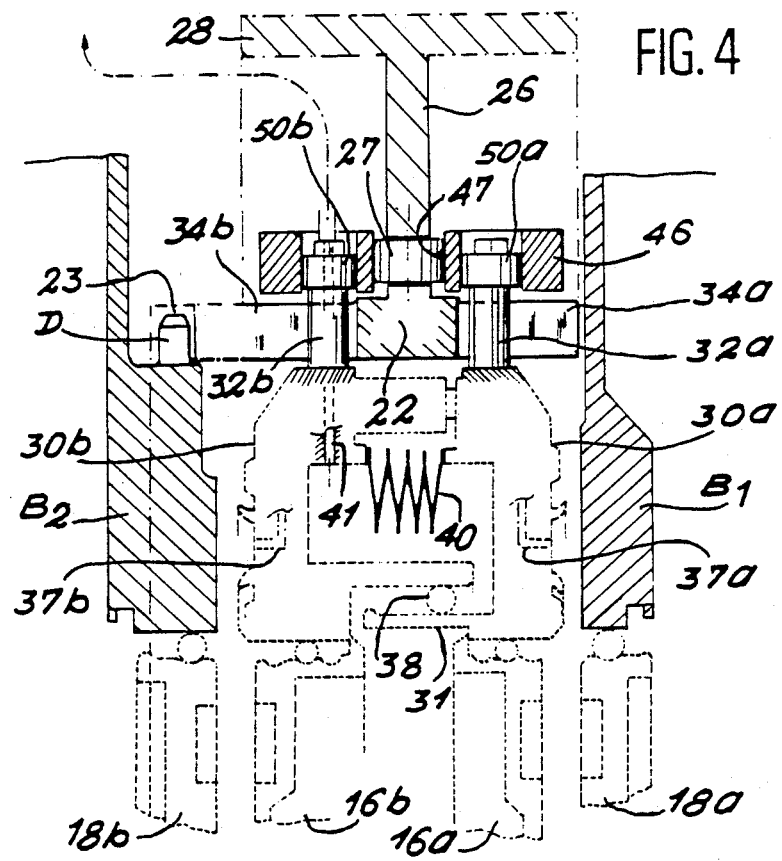
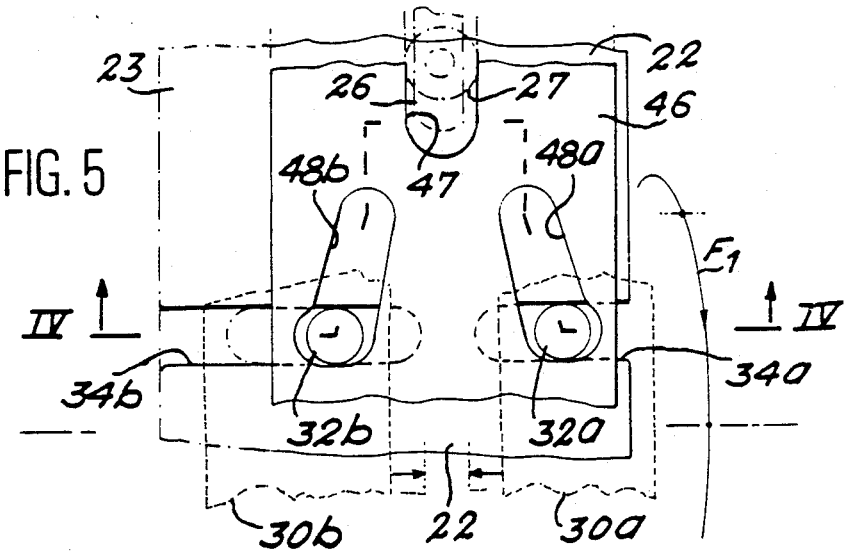

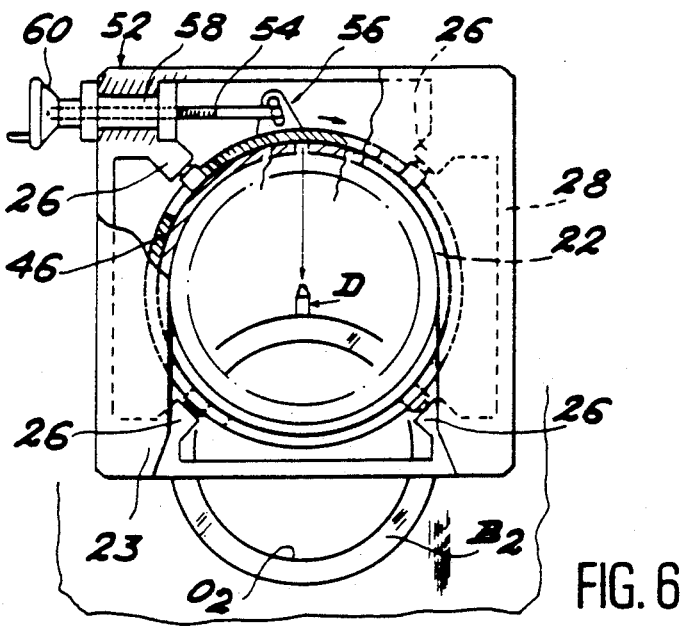
FIG. 6
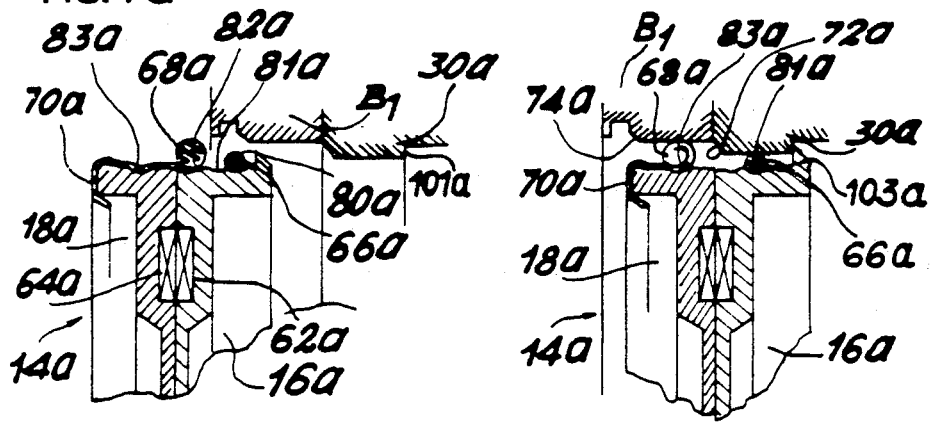
FIG. 7a
FIG. 7b
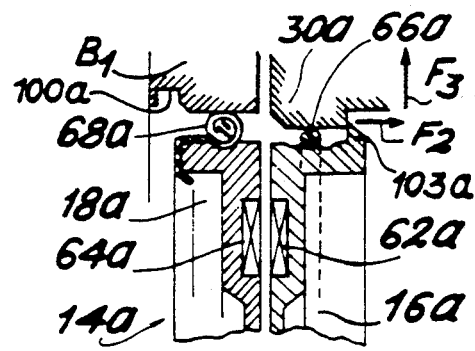
FIG. 7c

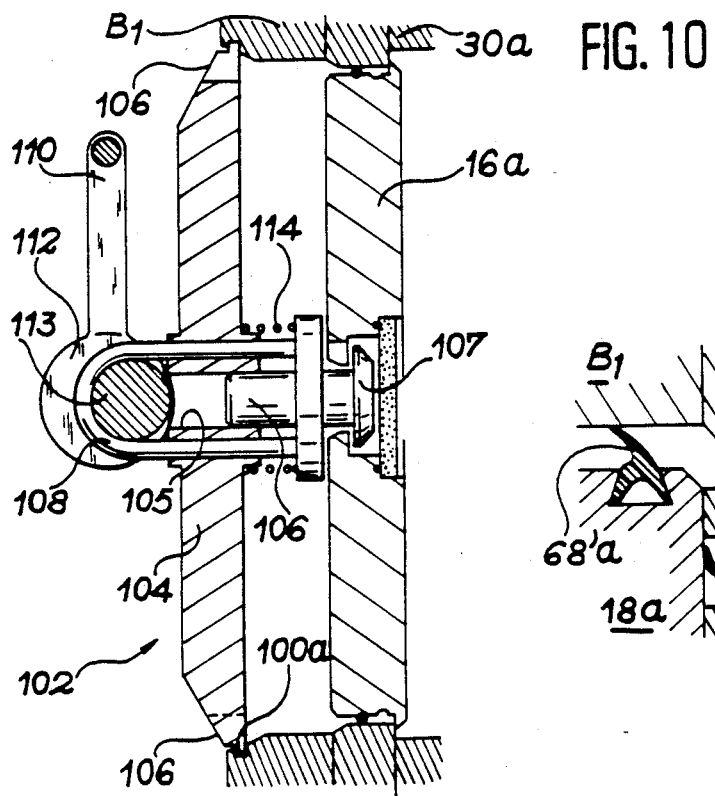
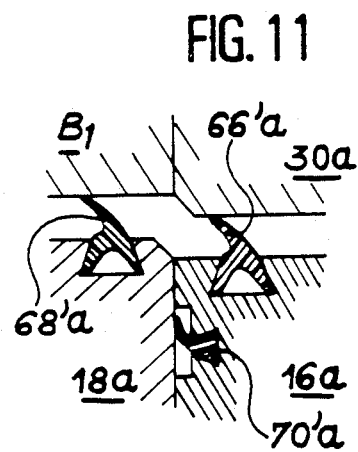
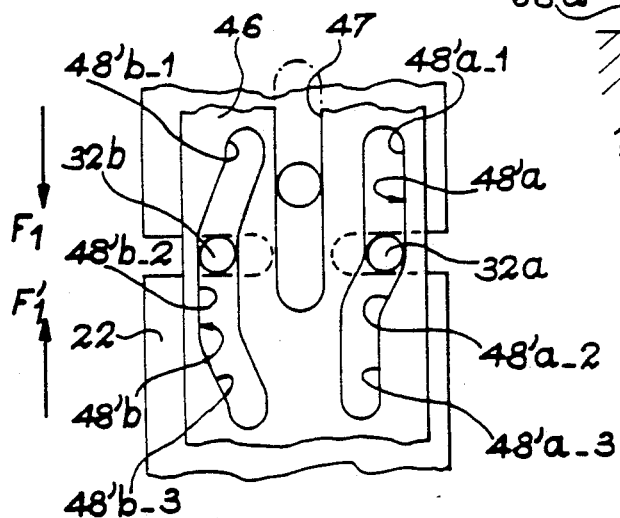
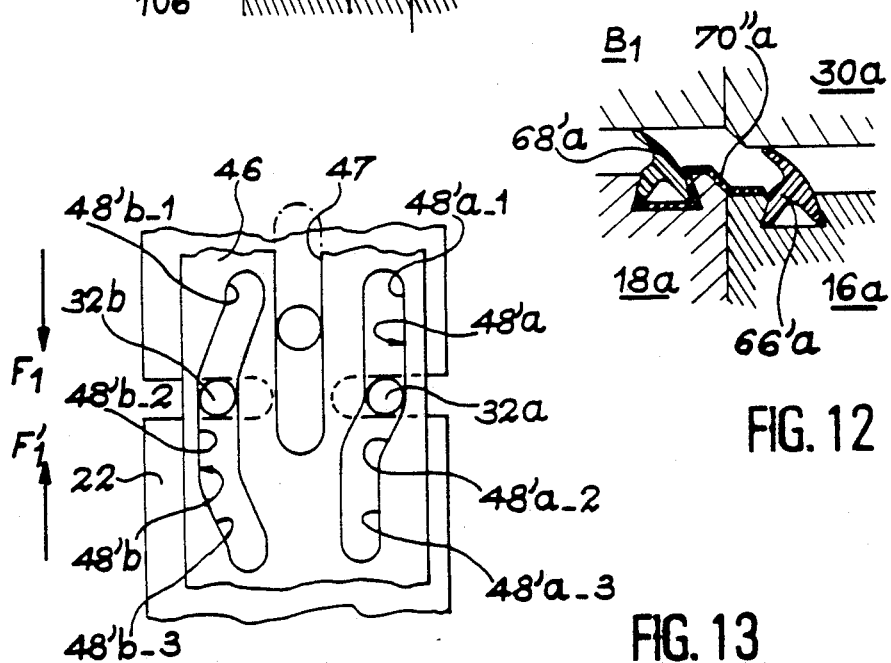
FIG. 10
FIG. 11
FIG. 12
FIG. 13

CONNECTOR DEVICE FOR TWO REACTOR CONTAINMENTS

FIELD OF THE INVENTION

The device relates to a disconnectable device making it possible to connect two reactor containments, such as confinement cells used in nuclear industrial applications.

BACKGROUND OF THE INVENTION

In order to implement certain processes, several reactor containments are connected so as to communicate with each other continuously. This situation occurs particularly in nuclear industrial applications, for example when dismantling spent nuclear fuel assemblies in the reactors. The machines successively carrying out the various dismantling operations are then placed inside the different containments communicating with one another.

In order to ensure the connection of two neighbouring containments, it is essential to take account of displacements capable to reaching several millimeters which exist by assembling between the axes of the openings opposite them by which the containments are to be connected. These displacements, due to the manufacturing tolerances of the containments, can also be both angular and lateral.

Moreover, although placing of these containments is virtually permanent, it may be necessary to interrupt communication. This situation particularly occurs when dismantling the installation. It may also occur in certain cases where special intervention is required in one of the cells. Thus, it is essential to dispose a disconnectable device whose conception makes it possible to avoid any rupture of the confinement when separating the containments.

Owing to its disconnectable nature, such a connection device moreover involves the use of imperviousness devices whose effectiveness must be able to be controlled and whose replacement must be able to be effected as simply as possible.

SUMMARY OF THE INVENTION

The object of the invention is to specifically provide a disconnectable device to connect two reactor containments whose conception allows it to be used, even when the connecting openings opposite them formed on these containments have their axes slightly angularly and/or laterally displaced, this device moreover enabling communication between the two containments to be interrupted as and when required and, if appropriate, to separate them without rupturing the confinement.

The object of the invention is also to provide a disconnectable device to connect two reactor containments whose conception greatly facilitates the replacement of the devices ensuring imperviousness.

To this end and according to the invention, a disconnectable device is proposed for connecting two reactor containments each having a connecting opening delimited by a flange, the connecting openings of the two containments being approximately aligned according to a common axis and the flanges being spaced from each other by a given approximate distance, this device being characterized in that it includes:

an assembly to place in communication the connecting openings of the containments in an impervious way in relation to the exterior of the containments, this assembly comprising a reference part provided with immobilization means with respect to the flanges of the cells, two linking parts cooperating with the reference part by means of the immobilization means in rotation around the axis of the connecting openings, these linking parts cooperating with one another in a sealed way so as to define an internal passage suitable for connecting the connecting openings, each of the linking parts bearing at least one imperviousness device suitable for taking sealed support on one of the flanges, said assembly finally comprising means to control a relative displacement between the linking parts parallel to said axis, and at least one double door formed of two doors held strapped down by magnetic devices authorizing a limited relative sliding between the doors, these two doors able to come and be fitted together in a sealed way respectively inside the connecting opening formed inside the flange of one of the containments and the passage formed in the adjacent linking part when said assembly provides sealed communication between the containments.

The conception of this device is such that any possible lateral and/or angular displacement between the axes of the connecting openings of the containments does not prevent the sealed connection of the two containments. In effect, the linking parts may in all cases be applied in a sealed way against the flanges and any lateral displacement may be compensated by a relative sliding between each of the doors of the double doors at the time they are placed.

Moreover, all the imperviousness devices belong to the assembly, said assembly being placed between the flanges in such a way that, in the event of one or more of these devices malfunctioning, the installation may be repaired by replacing this assembly by a new assembly after two double doors have been placed so as to conserve the confinement of the containments in relation to the exterior.

In one particular embodiment of the invention, the reference part comprises a ring encompassing the linking parts, the rotating immobilization means of these linking parts comprising at least one rod integral with each of the linking parts and projecting radially with respect to said axis through a notch formed in said ring parallel to said axis.

The means to control a relative displacement between the linking parts may then include a collar surrounding said ring, means to control a rotation of this collar around said axis and slits formed on the collar, said slits cooperating with the projecting extremities of said rods.

In one first embodiment of the invention, the slits formed on the collar are inclined symetrically in an opposite direction with respect to a circumferential direction so that one rotation of the collar provokes a simultaneous displacement and in an opposite direction of the linking parts parallel to said axis.

In a second embodiment of the invention, the slits formed on the collar comprise different successive sectors orientated circumferentially and inclined with respect to a circumferential direction so that one rotation of the collar in a first direction provokes a displacement of one of the linking parts parallel to said axis and that a rotation of the collar in an opposite direction successively provokes a displacement of the other linking part and then a displacement in the opposite direction of the first linking part parallel to said axis.

Preferably, the reference part then also includes a frame disposed outside the collar, this frame being made integral with the ring by at least three fixing feet orientated radially and regularly distributed around said axis, these feet traversing circumferential slits formed in the collar, the means for controlling a rotation of the collar around said axis being interposed between the frame and the collar.

So as to ensure that the linking parts are properly in sealed support against the flanges, even in the event of angular displacement between the axes of the connecting openings formed between the latter, elastic means are interposed, preferably between the linking parts, so as to stress the latter by spacing them from each other.

Preferably, so as to guarantee imperviousness between the interior of the containments and the exterior and so as to enable this imperviousness to be controlled, two concentric imperviousness devices, defining between them an annular imperviousness control chamber encompassing said passage, are interposed between the two linking parts. Similarly, each linking part bears two concentric lip seals encompassing said passage, said seals suitable for taking sealed support on one of the flanges. An imperviousness control pipe may then be formed in each of the linking parts and open between the lip seals.

According to one embodiment of the invention, the first of the doors of each double door, suitable for nesting inside one of the linking parts, includes an outer peripheral edge having three adjacent throats, an 0-ring being suitable for rolling between the two throats of the first door, said throats being the most distant from the second door under the effect of its cooperation with a cylindrical interior surface of the linking part, and a toric flange formed at an extremity of a skirt encompassing the peripheral edge of the second door and secured to the latter via its opposite extremity being suitable for rolling between the throat of the first door nearest the second door and the throat of the second door under the effect of its cooperation with a cylindrical interior surface of the flange.

As a variant, each of the doors is provided with a lip seal on its external peripheral surface. Depending on the case, one of the doors comprises an annular gasket at the periphery of the face of this door turned towards the other door, or an imperviousness band may be wound onto the adjacent parts of the peripheral surfaces of the doors.

BRIEF DESCRIPTION OF THE DRAWINGS

There now follows a description of an example, by no means restrictive, of a particular embodiment of the invention, together with reference to the annexed drawings in which:

FIG. 4 is a diagrammatic cutaway view according to the line IV—IV of FIG. 5 and illustrating the device during disconnection, FIG. 5 is a side view representing one part of the device of FIG. 4, FIG. 6 is a front view of the device according to the invention and diagrammatically representing the placing of this device between the containments, FIGS. 7a, 7b and 7c are diagrammatic cutaway views successively representing the placing of a double door of the device and then disconnection of the latter, FIG. 10 is a diagrammatic vertical cutaway view showing a tool designed to extract the door closing one of the linking parts, FIGS. 11 and 12 are larger-scale cutaway views illustrating two embodiment variants allowing for imperviousness to be provided between the doors and the corresponding flanges and the confinement of the interdoor gap, and FIG. 13 is a view similar to FIG. 5 showing an embodiment variant of the invention.

DETAILED DESCRIPTION OF THE PREFERRED EMBODIMENTS

Figure 1:
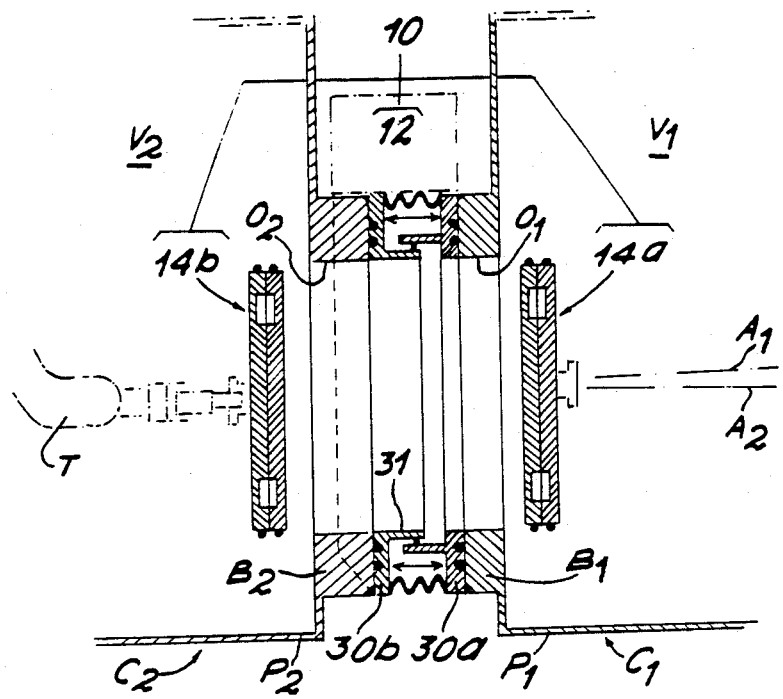
FIG. 1 is a vertical sectional side view illustrating in a diagrammatic way the placing of the disconnectable connection device according to the invention between two reactor containments.

FIG. 1 clearly diagrammatically represents the adjacent parts of two confinement cells $C_1$ and $C_2$ placed in communication by a connection device 10 according to the invention and sealed with respect to the exterior.

Each of the cells $C_1$ and $C_2$ includes a protection wall $P_1$, $P_2$ delimiting a closed volume $V_1$, $V_2$. According to the envisaged application, the cells $C_1$ and $C_2$ as well as the connection device 10 may be surrounded with a protection wall (not shown) made, for example, of concrete.

The cells $C_1$ and $C_2$ are normally immobilized in their working position illustrated on FIG. 1 by means (not shown). In this position the walls $P_1$ and $P_2$ of the two cells have two parts opposite them approximately parallel to each other and separated by a relatively small distance. Each of these parts opposite them is traversed by a connecting opening $O_1$ $O_2$ delimited by a flange $B_1$, $B_2$ welded onto the corresponding wall. These openings $O_1$, $O_2$ delimit interior cylindrical surfaces of the same diameter.

As shown on the straight line of FIG. 1, the axes $A_1$ and $A_2$ of these openings generally have an angular and/or lateral displacement with respect to each other. This displacement is due to both the manufacturing tolerances of the cells and the inaccuracy of their positioning. It may reach several millimeters.

The device 10 according to the invention is conceived so as to allow for the sealed placing in communication with respect to the exterior of the openings $O_1$ and $O_2$ and the possible separation of the cells without at any time rupturing the confinement of the closed volumes $V_1$ and $V_2$ with respect to the outer atmosphere, despite the inaccurate alignment of the openings $O_1$ and $O_2$.

As shown clearly diagrammatically on FIG. 1, the connection device 10 to this effect includes an assembly 12 ensuring, after assembling, sealed communication with respect to the exterior of the openings $O_1$ and $O_2$. The connection device 10 moreover includes two double doors 14a and 14b enabling the cells $C_1$ and $C_2$ to be separated without any imperviousness rupture with respect to the exterior.

As shown diagrammatically on FIG. 1, the assembly 12 is provided so as to be placed between the opposite walls of the cells $C_1$ and $C_2$. Thus, its thickness is less than the distance separating the opposite walls in which the openings $O_1$ and $O_2$ are formed. More precisely, the assembly 12 includes a part of variable thickness formed of two linking parts 30a and 30b mobile with respect to one another according to the axis of the openings $O_1$ and $O_2$. These linking parts are placed between the flanges $B_1$ and $B_2$ and they delimit a passage 31 whose shape and dimensions are identical to those of the openings $O_1$ and $O_2$.

Moreover, the double doors 14a and 14b may be placed permanently inside the cells $C_1$ and $C_2$. However, at least one of the cells is generally equipped with an access opening (not shown), of equal dimensions or dimensions greater than those of the openings $O_1$ and $O_2$, by which the double doors are introduced when they need to be mounted. In effect, the double doors 14a, 14b are dimensioned so as to be able to traverse the passage 31 connecting the openings $O_1$ and $O_2$ when the joints they support—and which shall be described subsequently—partially come out of joint at two locations diametrically opposite the double door. This putting in place can more especially be effected by means of a remote handling are T, as shown on FIG. 1, from the corresponding cell. As shall be seen subsequently when transported and installed, the double doors are preferably associated with a suitable tool.

Figure 2:
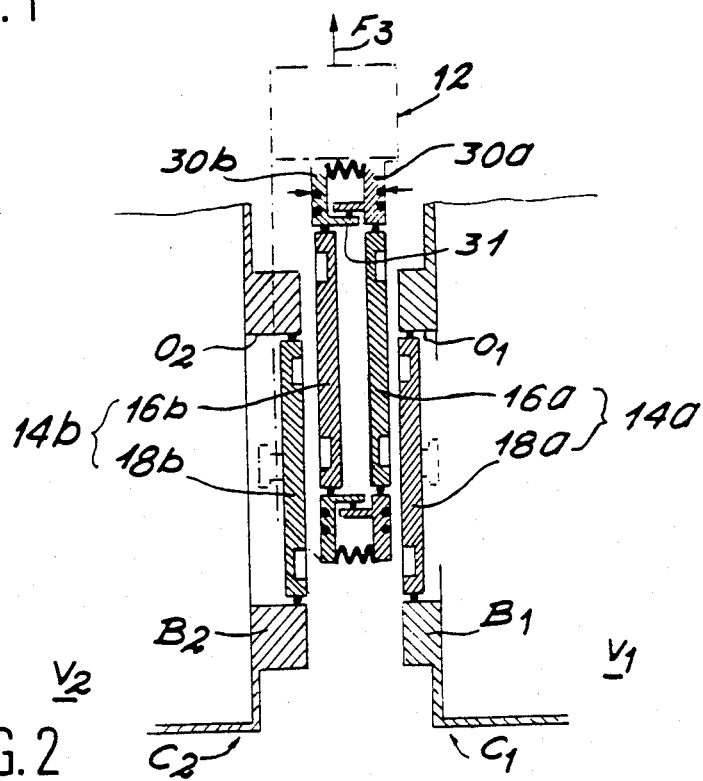
FIG. 2 is a view similar to FIG. 1 diagrammatically showing the disconnection of the connection device according to the invention.

As shown on FIG. 2, each of the double doors 14a and 14b are constituted by a first door 16a, 16b which comes out of joint in the passage 31 formed in the corresponding linking part 30a, 30b and by a second door 18a, 18b which comes out of joint in the corresponding opening $O_1$, $O_2$. After mounting of the double doors, a retraction of the part of variable thickness formed by the parts 30a and 30b has the effect of disconnecting at least one of the doors 16a and 16b from the corresponding door 18a, 18b so that the assembly 12 bearing the doors 16a and 16b may be disassembled without any rupture of the confinement of the volumes $V_1$ and $V_2$, the openings $O_1$ and $O_2$ remaining closed by the doors 18a and 18b.

As shown in more detail on FIGS. 3 to 6, the assembly 12 of the device 10 according to the invention includes a reference part 20 ensuring the positioning and fixing of the device between the flanges $B_1$ and $B_2$.

More specifically, the reference part 20 includes a ring 22 which encompasses the linking parts 30a and 30b. This ring 22 is extended to one of its extremities so as to form a U-shaped cradle suitable for coming and resting on a projecting part of one of the flanges $B_1$ and $B_2$ (the flange $B_2$ on FIG. 3). A finger D projecting onto the flange $B_2$ then comes and is housed inside a notch 34b formed on the ring 22 so as to immobilize in rotation the reference part 20 with respect to the flanges $B_1$ and $B_2$. Thus, the positioning of the assembly 12 is ensured in such a way that the passage 31 is within the alignment of the axis common to the flanges $B_1$ and $B_2$ at the near tolerances, and also the immobilization in rotation of the reference part 20 on the flanges opposite it. As a variant, this rotary immobilization can also be provided by an exterior reference part independent of the flanges $B_1$ and $B_2$.

As shown in particular on FIGS. 4 to 6, the ring 22 bears four feet 26 which extend radially outwards 90° from one another. The reference part 20 also includes a mechanical-welded frame 28 integral with the extremities of the feet 26.

The two linking parts 30a and 30b are mounted inside the ring 22 so as to be able to slide axially independently of each other inside this ring. To this effect, each of the parts 30a and 30b bears on its exterior periphery at least three radial rods 32a, 32b which traverse notches 34a, 34b formed in the ring 22 parallel to the axis of the latter. In the example shown, one of the notches 34b also receives the immobilization finger D of the flange $B_2$. The circumferential width of the notches 34a and 34b is only just larger than the diameter of the rods 32a and 32b so that the parts 30a and 30b are immobilized in rotation inside the ring 22, whilst being able to move parallel to the axis of the latter.

Moreover, each of the parts 30a and 30b has a radial extremity face provided with two annular throats with an axis merged with the axis of the passage 31 and in which are secured two lip gaskets or seals denoted respectively by the references 36a and 36b (FIG. 3) for the parts 30a and 30b. Each of the pairs of lip seals 36a and 36b may come and be applied against a corresponding radial surface formed on the nearest flange $B_1$, $B_2$, even if a displacement exists between the axes of the openings $O_1$ and $O_2$. The radial surfaces formed on the flanges $B_1$, $B_2$ are flat without any rough aspects, which allows for use of the flanges welded onto the walls of the cells. One sealing per joint is thus avoided and the lifetime of the cells is increased.

The parts 30a and 30b preferably comprise conduits or passages 37a, 37b (FIG. 4) respectively opening between the pairs of seals 36a and 36b. Each of these passages may be connected to an exterior sealing control device (not shown).

According to the functioning conditions of the device, the lip seals 36a and 36b may be disposed in different ways and the space formed between the lips of each pair of seals may be either a partial vacuum or one with excess pressure.

Figure 3:
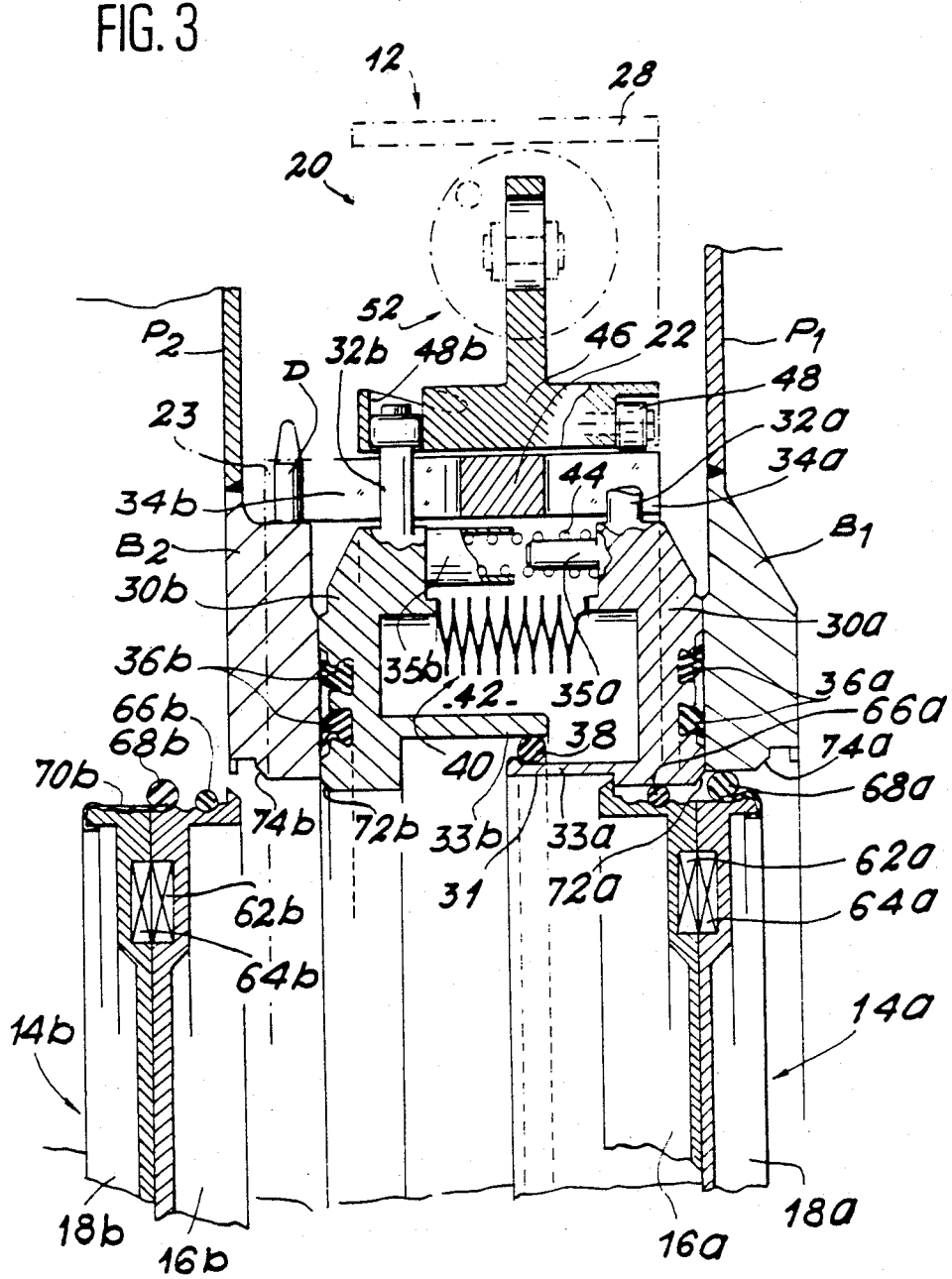
FIG. 3 is a large-scale cutaway view illustrating the device of FIGS. 1 and 2 when it ensures the connecting of the two containments.

Thus, when the inside of the cells $C_1$, $C_2$ is a partial vacuum, the lips of each pair of seals 36a, 36b may be distanced from each other, as shown on FIGS. 3 and 4. Then through the passages 37a, 37b, a partial vacuum is applied greater than the vacuum existing in the cells in order to flatten the lips of the seals against the flanges. Static sealing is thus obtained.

When the interior of the cells $C_1$, $C_2$ is a partial vacuum, the lips of the seals 36a, 36b may each also be directed towards each other. Then through the passages 37a, 37b, an excess pressure is applied or a partial vacuum less than that existing in the cells. The lips of the lower seals are thus flattened against the flanges so as to ensure static sealing. At the same time, the lips of the external seals are either flattened against the flanges or provide scanning of the inter-lip spaces by means of the outer atmosphere, depending on whether the pressure applied through the passages 37a, 37b is greater or less than the external pressure.

When the cells $C_1$ and $C_2$ are in a partial vacuum, the lips of the seals 36a and 36b may finally be directed towards the interior. Then through the passages 37a, 37b, an excess pressure is applied greater than the internal partial vacuum, which has the effect of flattening the lips of the exterior seals against the flanges and providing a gas scavenging from the inter-lip space towards the interior of the cells. This configuration avoids contamination being deposited.

When the interior of the cells $C_1$ and $C_2$ is one of excess pressure, the lips of the seals 36a, 36b may also be spaced from each other, as shown on FIGS. 3 and 4. In this case, through the passages 37a, 37b, a partial vacuum is applied less than the internal excess pressure. The lips of the seals are then flattened against the flanges and provide static sealing.

When the cells are with excess pressure and when the lips of the seals are each directed towards the other, through the passages 37a and 37b an excess pressure is applied less or greater than the pressure existing inside the cells. The lips of the external seals are thus flattened against the flanges. At the same time, the lips of the internal seals are either flattened against the flanges or provide a scanning of the inter-lip space, depending on whether the pressure applied through the passages 37a and 37b is greater or less than the pressure in the cells.

When the cells $C_1$ and $C_2$ are in excess pressure, the lips of the seals 36a and 36b may also be directed towards the exterior. Then through the passages 37a, 37b, a pressure greater than the internal pressure is applied, which has the effect of flattening the lips of the interior seals against the flanges, thus ensuring static sealing. On the other hand, a scanning is provided by the outer seals of the interlip space towards the exterior.

Each of the linking parts 30a and 30b comprise a tubular part 33a, 33b interiorly delimiting the passage 31. These two tubular parts have different diameters and lengths so that the extremity of the part 33a is always situated inside the extremity of the part 33b, even when the gap between the parts 30a and 30b is maximal. A toric gasket 38 is interposed between these tubular parts, as illustrated in FIG. 3, so as to ensure continuous sealing between these two parts.

The linking parts 30a and 30b are also connected in a sealed way by means of an imperviousness bellows 40 encompassing the tubular parts 33a and 33b and each of whose extremities is secured to one of the parts 30a, 30b. Preferably, as illustrated on FIG. 3, these imperviousness bellows 40 are formed of adjacent spring washers alternately welded together via their internal and external peripheral edges so that its thickness is as reduced as possible.

The seal 38 and the bellows 40 provide a double sealing between the passage 31 and the exterior. An imperviousness control chamber 42 is thus formed between the seal 38 and the bellows 40 inside the parts 30a and 30b. This chamber 42 can be connected by a passage 41 formed inside one of the parts 30a, 30b to an external sealing control device (not shown). This configuration avoids any internal contamination of the bellows 40, as well as any accumulation of solid or liquid particles risking damaging the waves of the bellows. In addition to the aforesaid functions, the passages 37a, 37b and 41 allow for a scanning of the interlips' chambers 36a, 36b, the chamber 42 and, if appropriate, the air lock formed inside the linking parts 30a, 30b when the double doors 14a, 14b are in place. Thus, it is possible to work under a specific atmosphere by injecting this atmosphere through the passages 37a, 37b and 41.

As can be seen on FIG. 3, compression springs 44 are interposed between the linking parts 30a and 30b outside the bellows 40 so as to apply each of these parts against the flange opposite them. The springs 44 are evenly distributed around the axis of the assembly 12 and are kept in place, for example, by being nested on bearing pads 35a integral with the part 30a at one of their extremities and coming and being housed inside sleeves 35b integral with the part 30b at their opposite extremity. As shall be seen subsequently, these springs 44 make it possible to apply in a sealed way the seals 36a, 36b against the flanges $B_1$ and $B_2$, even if an angular displacement exists between the axes of the openings $O_1$ and $O_2$.

In the configuration just described, the bellows 40 are protected internally by the tubular parts 33a and 33b of the linking parts and externally by the ring 22. As a result, any risk that these bellows might be damaged accidentally by an object is virtually avoided.

So as to control the simultaneous displacement of the linking parts 30a and 30b, whether by bringing them together or by distancing them from each other, around the ring 22 of the reference part a rotating collar 46 is disposed and whose axis is merged with that of the ring 22 and the passage 31. This collar 46 is supported so as to revolve around this axis by means of the ring 22. To this effect, it is equipped at each of its extremities with a certain number of rollers which roll on the external surface of the ring 22. One of these rollers is shown at 48 on FIG. 3.

Circumferential slits 47 are formed inside the collar 46 opposite the feet 26 so as to allow for the passage of the latter without impeding rotation of the collar. Preferably (FIGS. 4 and 5), rollers 27 borne by the feet 26 cooperate with the edges of the slits 47 so as to ensure the axial positioning of the collar 46 with respect to the reference part 20.

As shown more particularly on FIG. 5, the collar 46 also comprises slits 48a and 48b slanted symmetrically with respect to a median radial plane according to which the slits 47 are formed. The extremities of the rods 32a and 32b penetrate inside these slits 48a and 48b. So as to facilitate guidance and as shown on FIG. 4, the extremities of the rods 32a and 32b bear guiding rollers 50a, 50b which cooperate with the edges of the slits 48a and 48b. The slanted slits 48a and 48b thus form ramps ensuring guiding of the rollers mounted at the extremities of the rods 32a and 32b. The shape of the slits 48a, 48b is such that a rotation of the collar around the axis of the assembly 12 has the effect, depending on the direction of this rotation, of moving the linking parts 30a by spacing them from each other or by bringing them closer together.

In the embodiment example shown on FIGS. 3 and 6, such a rotation of the collar 46 is controlled by a mechanism 52 inserted between this collar and the frame 28. More precisely, this mechanism 52 includes a screw rod 54 whose extremity is joined onto a foot 56 integral with the collar 46. The screw rod 54 is screwed into a nut 58 supported in a revolving way by the frame 28. This nut 58 is connected to a crank 60 or motorization system. Activation of the crank 60 or the corresponding motorization in either direction ensures the desired rotation of the collar 46 around its axis (arrow $F_1$ on FIG. 5).

In order to complete the description of the connection device according to the invention, reference should now be made to FIGS. 7a to 7c which show in more detail the structure of each of the double doors 14a and 14b. As these double doors are identical, only the double door 14a shall be described here. The references of the devices constituting the double door 14b are the same and are allocated with the letter b.

As has already been mentioned, the double door 14a includes a door 16a able to come and seal off the linking part 30a, and a door 18a able to seal off the flange $B_1$. The doors 16a and 18a are normally joined side by side on two flat or roughly flat surfaces allowing for a certain relative sliding between the two doors. The linkage between the doors is ensured by magnets 62a, 64a which do not oppose such a sliding.

Each of the doors 16a and 18a has an approximately cylindrical exterior peripheral edge and is of the same diameter. However, the peripheral edge of the door 16a, provided so as to come and seal off the linking part 30a, has three annular throats 80a, 81a, 82a with a circular arc-shaped section disposed side by side, whilst the peripheral edge of the door 18a has a single throat 83a with a circular arc-shaped section close to the door 16a (FIG. 7a).

FIG. 7a show the double door 14a in the position it occupies before being placed inside the linking part 30a and the flange $B_1$. In these conditions, it can be observed that the door 16a, provided so as to come and be housed inside the part 30a, bears a toric gasket 66a mounted in the throat 80a furthest from the door 18a. One extremity of a sealed skirt 70a encompassing the peripheral edge of the door 18a is secured to the latter at the side opposite the door 16a. At its opposite extremity, the skirt 70a is made integral with a toric flange 68a which is housed inside the throat 82a of the door 16a closest the door 18a. The skirt 70a then covers the entire external peripheral edge of the door 18a, as well as the meeting point between the two doors.

The shapes of the internal cylindrical surface of the openings $O_1$ and $O_2$ formed on the flanges $B_1$ and $B_2$ of the passage 31 formed inside the parts 30a and 30b also appear in more detail on FIGS. 3 and 7a to 7c.

Thus, taking as a basis the interior of the cell C, the cylindrical opening $O_1$ formed inside the flange $B_1$ firstly includes a throat 100a (FIG. 7c) whose external shoulder is interrupted so as to allow for the fixing of a tool by means of a bayonet system, as shall be seen subsequently. This opening O then includes a chamfer 74a (FIG. 7b) followed by a cylindrical part of uniform diameter.

Taking as a basis the interior of the cell $C_1$, the passage 31 formed in the part 30a includes a chamfer 72a (FIG. 7b), followed by a cylindrical part of uniform diameter, ended by a shoulder 101a (FIG. 7a) turned towards the exterior of the cell. The diameter of the cylindrical part of the passage 31 is slightly larger than that of the cylindrical part of the opening $O_1$.

Gradually as the double door is nested, as shown on FIG. 7b, the seal 66a and the flange 68a roll onto the exterior peripheral edges of the doors after clearing of the chamfers 72a and 74a under the effect of their cooperation with the interior cylindrical surfaces of the linking part 30a and the flange B. Under the effect of these rollings, the seal 66a passes into the central throat 81a of the door 18a and the flange 68a passes into the throat 83a of the door 18a by being wound onto the skirt 70a. At the same time, a flexible flange 103a formed at the extremity of the exterior peripheral edge of the door 16a turned towards the exterior of the cell $C_1$ comes to take support against the shoulder 101a. The flexible flange 103a may be embodied directly inside the door 16a if the latter is made of a ductile plastic material. Each of the two doors 16a, 18a of the double door is then secured in a sealed way respectively inside the linking part 30a and inside the flange $B_1$.

It should be noted that the use of the flange 68a formed at the extremity of the skirt 70a makes it possible to protect the exterior peripheral edge of each of the doors of the double door and the space formed between these doors against the contamination existing inside the cells.

when the device is initially placed between two cells $C_1$ and $C_2$, only the assembly 12 is used. As shown in particular on FIGS. 1 and 6, this assembly is placed in such a way that the cradle 23 formed on the ring 22 comes and overlaps the projecting part of the flange $B_2$ and is immobilized in rotation by the finger D formed on the latter. Of course, this placing is ensured when the two linking parts 30a and 30b are brought close to each other so that their thickness is less than the distance existing between the flanges $B_1$ and $B_2$.

When the assembly 12 is positioned and immobilized between the flanges, the mechanism 52 is activated so as to make the collar 46 turn in the direction corresponding to the spacing of the linking parts 30a and 30b. The lip seals 36a and 36b borne by these parts are thus applied in a sealed way against the flanges $B_1$ and $B_2$. The springs 44 inserted between the two parts then allow for a possible angular dislocation to be compensated between the axes of the flanges when a radial dislocation between the axes is also possible. This action of the springs 44 is rendered possible by the fact that in these conditions a certain axial play exists between the rods 32a, 32b and the slits 48a, 48b (FIG. 5).

The connection device according to the invention thus occupies the position established in the normal operating conditions of the cells $C_1$ and $C_2$. It should be noted that the conception of the assembly 12 provides the latter with a relatively reduced thickness, thus providing the passage connecting the two cells with a slightly larger length. Owing to this, it is possible to easily transfer objects from one cell to another, for example by means of a remote handling device, which would not be possible with a thicker assembly.

In addition, the assembly 12 procures an all-level sealing double barrier. Thus, the internal volume in the cells $C_1$, $C_2$ and the passage 31 connecting the latter is separated from the exterior by the two seals 36a between the part 30a and the flange B, by the two seals 36b between the part 30b and flange $B_2$, and by the seal 38 and the imperviousness bellows 40 between the two linking parts 30a and 30b. In addition to its effectiveness, as seen earlier, this double sealing makes it possible to carry out, if appropriate, a control of the various sealing devices.

Given the fact that all the sealing devices are borne by the mobile assembly 12, the device according to the invention also makes it possible to easily intervene without breaking the imperviousness of the cells when one or more of these devices is/are defective.

In these conditions, the two double doors 14a and 14b are placed as described previously. When this placing is finished, the mechanism 52 is used in the direction tending to bring together the linking parts 30a and 30b. By construction, the fixing force obtained by the toric seals 66a and 66b of the doors 16a and 16b respectively on the parts 30a and 30b is greater than the linking force between the doors provided by the magnets 62a, 64a and 62b, 64b. Bringing together of the parts 30a and 30b is thus accompanied by a separation of the doors 16a and 18a and 16b and 18b respectively (arrow $F_2$ on FIG. 7c). The assembly 12 may then be disassembled without breaking the imperviousness of the volumes $V_1$ and $V_2$ or the internal volume in this assembly (arrow $F_3$ on FIGS. 2 and 7c). A new assembly identical to the assembly 12 may then be put in place.

The same operations are carried out when separation of the cells $C_1$ and $C_2$ is required, for example at the time of dismantling the installation.

The connection device according to the invention can also be used as an air lock making it possible to transfer certain products between a contaminated cell $C_1$ and a non-contaminated cell $C_2$. The products to be transferred are introduced from the cell $C_1$ into the interior of the passage 31 after placing of the double door 14b separating this passage from the cell $C_2$. The double door 14a separating the passage 31 from the cell $C_1$ is placed in its turn and the atmosphere contained in the passage is ventilated. To this end, inlet and outlet nozzles communicating with an exterior ventilation and filtration circuit then open into the passage formed inside the parts 30a and 30b. When the internal atmosphere in the passage 31 has been sufficiently ventilated, the double door 14b is opened and the products are introduced into the cell $C_2$.

Figure 8:
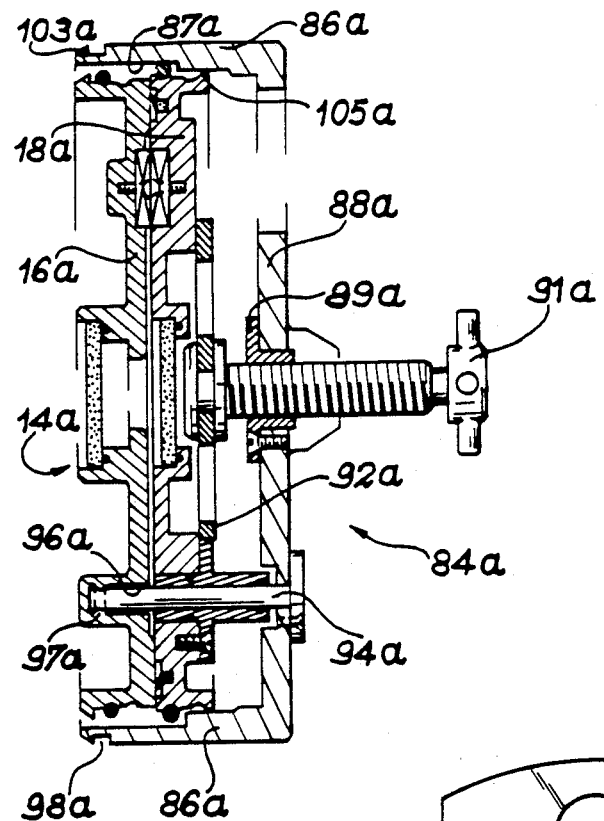
FIG. 8 is a vertical cutaway view diagrammatically showing a tool designed to convey and place each of the double doors and to extract the door of the cell.
Figure 9:
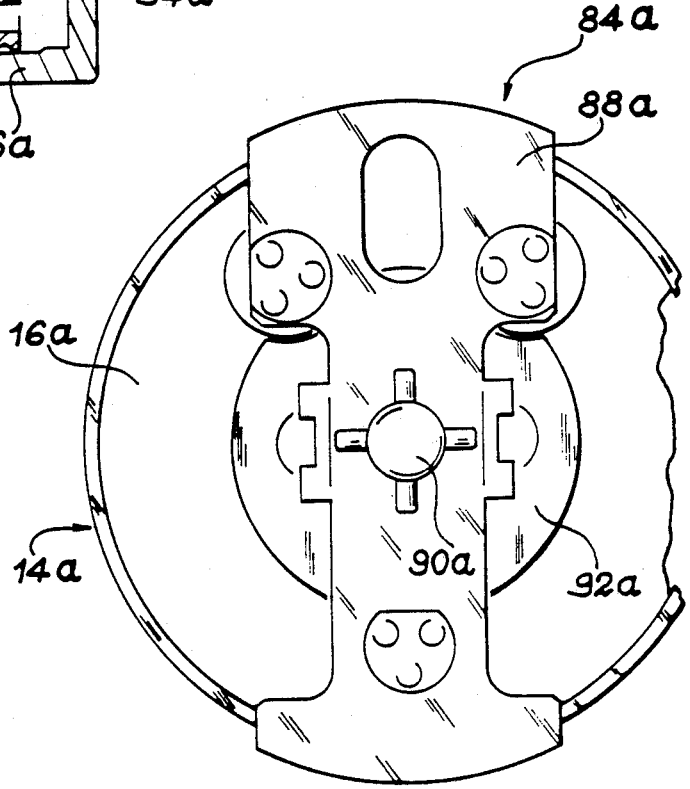
FIG. 9 is a flat view of the tool of FIG. 8 equipped with its double door.

As shown on FIGS. 8 and 9, for the double doors 14a and 14b and so as to transport them, place them and support them without risking damaging the inside of the cells, a tool linked to the door 16a of the cell is connected to each of the double doors 14a and 14b.

This tool 84a includes two circular arc-shaped segments 86a connected by a plate 88a bearing at its center a nut 89a in which a screw 90a is screwed whose axis coincides with the axis of the segments 86a. The extremity of the screw 90a situated at the side of the segments is rendered translation integral with a plate 92a linked to the door 18a of the cell, whilst being able to turn freely with respect to the screw.

Furthermore, three guide rods 94a are secured to the plate 88a and project from the side of this extremity of the screw 90a parallel to the axis of the latter. These rods 94a traverse in a sealed way the door 18a of the cell and their extremities are received in the blind holes 96a formed in the door 16a when the two doors 16a and 18a are in the transport position. The double door 14a is locked in this position, as shown on FIG. 8, by the engagement of gills 97a formed inside the blind holes 96a on the ring grooves formed on the rods 94a. The double door 14a is then totally housed inside a stepped bore 87a formed in the segments 86a. A flexible flange 105a, formed at the extremity of the peripheral edge of the door 18a turned towards the inside of the cell, is then in contact with the part with the smallest diameter of this stepped bore so as to ensure centering of the double door.

As shown on FIG. 8, a ring groove 98a is formed on the exterior cylindrical surface of the segments 86a near its extremity furthest from the plate 88a. The shape of this groove 98a is complementary of the throat 100a formed at the extremity of the interior cylindrical surface of the flange B turned towards the interior of the cell $C_1$ These two extremities thus constitute a bayonet locking system enabling the tool 84a to be rotary secured to the flange $B_1$.

At its extremity not linked to the door 16a of the cell $C_1$, the screw 90a is equipped with a control head 91a enabling rotation of the screw to be remote-controlled by means of a remote handling device.

When the tool 84a is secured to the flange $B_1$ by means of the above-described bayonet system, rotary driving of the screw 90a has the effect of simultaneously nesting the two doors 16a and 18a respectively in the part 30a and the flange $B_1$. In the course of this operation, the seals 66a and 68a cooperate with the interior surfaces of the part 30a and the flange, as described previously. As has already been seen, locking of the door 16a is ensured by penetration of the flexible flange 103a formed at its periphery beyond the shoulder formed in the part 30a.

In these conditions, the rods 94a are totally freed from the dummy bores formed in the door 16a when they still seal up the holes formed in the part 18a of the container. The assembly 12 bearing the doors 16a and 16b may thus be dismantled as described previously, whereas the doors 18a and 18b remain in place. At this moment, it should be observed that the tool associated with each of these doors 18a and 18b remains in Place and constitutes a safety device preventing any accidental opening of the corresponding doors.

A maneuver in the opposite direction of the screw 90a allows the door 18a to be extracted from the flange $B_1$. During this operation, the door 16a remains in place, as the force exerted by the magnets 62a, 64a is insufficient to extract this door from the part 30a.

Dismantling of the doors 16a and 16b thus requires the use of a second tool, which shall now be described briefly by referring to FIG. 10.

The tool 102 of FIG. 10 is represented at the time of disassembling the door 16a. This same tool or an identical tool is used to disassemble the door 16b.

The tool 102 comprises a bar 104 whose circular arc-shaped extremities have a form complementary of the throat 100a formed at the extremity of the interior cylindrical surface of the flange $B_1$ turned towards the interior of the cell $C_1$. The bar 104 can thus be fixed into the flange $B_1$ by means of a bayonet system so as to be orientated radially with respect to the axis of this flange.

The bar 104 is traversed at its center by a bore 105 in which a cylindrical extremity of a gripping part 106 is sliding received. The two arms of a U-shaped part 108 are secured at their extremities to the part 106 and traverse holes formed in the bar 104 on both sides of the bore 105. This U-shaped part 108 thus rotary immobilizes the part 106 with respect to the bar 104.

The opposite extremity of the part 106 constitutes a gripping nose 107 which penetrates into a dummy recess formed at the center of the door 16a on its face turned towards the interior of the cell $C_1$ when the extremities 106 of the bar 104 penetrate into the structure 100a. Moreover, the respective shapes of the gripping nose 107 and the recess are such that rotation of the bar 104 making it possible to secure the latter to the flange $B_1$ also renders the door 16a translation integral with the gripping part 106.

The tool 102 of FIG. 10 also includes a control handle 110 integral with a cam 112 whose central part 113, of a smaller diameter and with an axis displaced with respect to the axis of the cam, is imprisoned between the U-shaped part 108 and the face of the bar 104 turned towards the interior of the cell $C_1$. A compression spring 114 takes support by means of its extremities on the opposite face of the bar 104 and the gripping Part 106 so as to continuously keep the cam 112 in support on the bar 104.

When the tool 102 is placed inside the flange $B_1$ in the way as described previously, the handle 110 is placed, as shown on FIG. 10, in the position in which the distance separating the gripping nose of the bar 104 is maximum. In these conditions, the bar 104 is secured to the flange $B_1$ and the door 16a seized by the gripping part 106.

By tilting the handle 110, an axial force is then exerted on the door 16a which has the effect of extracting it from the part 30a. Dismantling of the door 16a is thus effected Of course, the mode of embodiment just described may undergo various modifications without departing from the context of the invention.

Accordingly, instead of associating with each double door a plain toric seal and a skirt seal in the way as described previously, in particular by reference to FIGS. 7a to 7c, protection of the interdoor space against contamination and imperviousness of sealing may be ensured separately.

Imperviousness of sealing may in particular be ensured by equipping the exterior peripheral surface of each of the doors 16a and 18a with a throat in which mounted is a lip seal 66'a, 68'a respectively, as illustrated on FIGS. 11 and 12.

FIG. 11 shows that protection of the interdoor space against contamination is ensured by a ring sealing 70'a housed inside a throat formed at the periphery of the face of one of the doors (16a on FIG. 11) turned towards the other door.

FIG. 12 represents another solution whereby protection of the interdoor space against contamination is ensured by a sealing band 70"a, made, for example, of rubber, wound onto the adjacent parts of the exterior peripheral surfaces of the doors 16a and 18a. This band is then placed prior to the double door being introduced into the cell.

Of course, the sealing joint 70'a of FIG. 11 and the sealing band 70"a of FIG. 12 may be used with seals different from the lip seals 66'a and 68'a shown on these figures. These lip seals may in particular be replaced by plain toric seals rolling between two grooves formed on the surface of each of the doors.

Moreover, the device described and referring to FIGS. 1 to 10 is conceived in such a way that the removal of a cell linked to two adjacent cells by two of these devices requires the placing of the two double doors of each device. In effect, the slits 48a and 48b (FIG. 5) are totally symmetrical so that a rotation of the collar 46 results in simultaneously breaking the sealing between each of the linking parts 30a, 30b and the flange B₁, B₂ of the corresponding cell.

FIG. 13 shows an embodiment variant whereby the shape of the slits 48'a and 48'b formed on the collar 46 allows for separate retraction of either the linking part 30a or the linking part 30b, with successive retraction of these two parts also being possible.

In this variant, taking as a basis one extremity, each of the slits 48'a has a circumferential section 48'a-1 parallel to the slits 47, a slanted section 48'a-2 drawing nearer to the slits 47, and another circumferential section 48'a-3 parallel to the slits 47 and closer to the latter than the first circumferential section. Taking as a basis this same extremity, each of the slits 48'b has a slanted part 48'b-1 moving away from the slits 47, a circumferential part 48'b-2 parallel to the slits 47, and another slanted part 48'b-3 drawing closer to the slits 47. The length of the circumferential part 48'b-2 of each slit 48'b is slightly longer than the length of the slanted part 48'a-2 of each slit 48'a so that, when the rollers 50b are situated at either of the extremities of the circumferential section 48'b-2 of the slits 48'b, the rollers 50a are already engaged in either of the circumferential parts 48'a-1 and 48'a-3 of the slits 48'a.

FIG. 13 shows the position occupied by the collar 46 when the device is in place between two cells. The rollers 50a are then situated at the extremity of the first circumferential part 48'a-1 of the slits 48'a adjacent to the slanted part 48'a-2 of these slits and the rollers 50b are situated at the extremity of the circumferential part 48'b-2 of the slits 48'b adjacent to the first slanted part 48'b-1 of these slits.

If it is desired to separate the linking part 30b from the corresponding cell flange whilst keeping the linking part 30a in support on the other cell flange, the collar 46 is turned in the direction shown by the arrow F1 on FIG. 13. The rods 32a then move into the first circumferential part 48'a-1 of the slits 48'a so that the part 30a does not move. At the same time, the rods 32b move into the first slanted part 48'b-1 of the slits 48'b in such a way as to draw closer to the slits 47, thus retracting the linking part 30b.

If on the other hand it is desired to separate the linking part 30a from its cell flange without breaking sealing between the linking part 30b and the other cell flange, the collar 46 is turned in the direction as shown by the arrow F'1 opposite that of the arrow indicated by the arrow F1 until the rods 32b arrive at the extremity of the circumferential part 48'b-2 of the slits 48'b adjacent to the second slanted parts 48'b-3 of these slits. The rods 32b then move into the circumferential part 48'b-2 of the slits 48'b so that the linking part 30b remains in sealed support against the corresponding cell flange. At the same time, the rods 32a move into the slanted part 48'a-2 of the slits 48'a, which has the effect of bringing them closer to the slits 47 and, accordingly, retracting the linking part 30a.

If it is desired to retract the two linking parts, the collar 46 is turned in the direction shown by the arrow F'1 so as to retract the part 30a as described above and then to continue rotation of the collar so that the rods 32b also traverse the second slanted part 48'b-3 of the slits 48'b. The rods 32b then draw close to the slit 47, which has the effect of retracting the linking part 30b with respect to the corresponding cell flange. At the same time, the rods 32a traverse the second circumferential part 48'a-3 of the slits 48'a so that the linking part 30a remains in the retracted position.

By means of the device of the invention modified according to FIG. 13, it is possible to disassemble a cell connected to two adjacent cells by means of two devices according to the invention by only placing in each of these devices one double door, which is placed at the side of the cell to be disassembled.

Disassembling of the device similar to that of the device of FIGS. 1 to 11 is also still possible, since a complete rotation of the collar 46 in the direction as shown by the arrow F'1 enables the two linking parts 30a and 30b to be retracted.

It should be noted that the device according to the invention may, if required, be secured onto a cell flange so as to allow for the connection of another cell without any additional machining being required. Holes (not shown) may in fact be construction provided at the periphery of one of the linking parts 30a, 30b so as to allow for this part to be secured by means of a screw to the flange of a cell. The corresponding rods 32a or 32b are disassembled and replaced by screws whereby the ring 22 is secured to the linking part. Rotation of the collar 46 then enables retraction of the other linking part to be controlled.

In this last configuration, the device according to the invention constitutes a lock requiring a single door in order to separate it from he cell where it is secured. As previously, the connection with the other cell requires the use of a double door. This configuration enables the overall cost to be reduced when the link between the cells does not require any biological protection.

In addition to the previously mentioned advantages, the device according to the invention has a reduced length enabling the space separating the cells to be given a very short width. This characteristic makes it possible to avoid having to resort to using a conveyor or equivalent system in order to transport the objects between the cells. In the nuclear industry, it also enables the material required for shielding to be reduced and accordingly the cost involved.

The device according to the invention is also easy to install and admits significant defects of parallelism, eccentricity and spatial requirement between the cells.

Moreover, the sealing between the lip seals borne by the linking parts 30a, 30b and the cell flanges $B_1$, $B_2$ is provided by pressure without any relative rotation between these parts. In the nuclear industry, this characteristic avoids the contamination spillover effect which occurs when sealing is obtained by relative rotation. This sealing by simple pressure thus avoids resorting to using locking systems. Accordingly, it suppresses any risk of gripping and ensures that the mechanism is damaged by deformations of the walls of the cells due to accidental pressures or partial vacuums.

The structure of the connection device according to the invention also has the advantage of able to be disassembled, even in cases where its retraction system breaks down. Indeed, given the fact that no obstacle prohibits any radial displacement of the assembly 12, it is still possible to exert on the latter a force sufficient in this direction in order to extract it in opposition to any mechanical rubbings existing between the cell flanges and the linking parts 30a, 30b.

What is claimed is:

1. A disconnectable device for connecting two reactor containments each having a connecting opening delimited by a flange, the connecting openings of the two containments being approximately aligned according to a common axis and the flanges being spaced at an approximate given distance, whereby this device comprises:

an assembly to place in communication the connecting openings of the containments in a sealed way with respect to the exterior of the containments, this assembly comprising a reference part provided with immobilization means with respect to the flanges of the cells, two linking parts cooperating with the reference part by means of rotary immobilization means around the axis of the connecting openings, these linking parts cooperating together in a sealed way so as to define an internal passage suitable for connecting the connecting openings, each of the linking parts bearing at least one sealing device suitable for coming to take sealed support on one of the flanges, said assembly finally comprising means to control a relative displacement between the linking parts parallel to said axis, and at least one double door each formed of two doors kept attached by magnetic devices authorizing a limited relative sliding between the doors, these two doors able to come and be nested in a sealed way respectively inside the connecting opening formed in the flange of one of the containments and the passage formed in the adjacent linking part when said assembly ensures a sealed communication between the containments.

2. A device as recited in claim 1, wherein the reference part includes a ring encompassing the linking parts, the means to rotary immobilize the latter comprising at least one rod integral with each of the linking parts and projecting radially with respect to said axis through a notch formed in said ring parallel to said axis.

3. A device as recited in claim 2, wherein the means to control a relative displacement between the linking parts comprise a collar encompassing said ring, means to rotary control this collar around said axis, and slits formed on the collar with which cooperate the projecting extremities of said rods.

4. A device as recited in claim 3, wherein the slits formed on the collar are slanted symmetrically in the opposite direction with respect to a circumferential direction so that a rotation of the collar provokes a simultaneous displacement and in the opposite direction of the linking parts parallel to said axis.

5. A device as recited in claim 3, wherein the slits formed on the collar include different successive sectors orientated circumferentially and slanted with respect to a circumferential direction so that a rotation of the collar in a first direction provokes a displacement of a first linking part parallel to said axis and a rotation of the collar in the opposite direction successively provokes a displacement of the other linking part, and then a displacement in the opposite direction of the first linking part parallel to said axis.

6. A device as recited in claim 3, wherein the reference part also includes a frame disposed outside the collar, this frame being rendered integral with the ring by at least three fixing feet orientated radially and regularly distributed around said axis, these feet traversing circumferential slits formed in the collar, and means for controlling a rotation of the latter around said axis being inserted between the frame and the collar.

7. A device as recited in claim wherein elastic means are inserted between the linking parts so as to stress the latter when spacing them from each other.

8. A device as recited in claim 1, wherein two concentric sealing devices, defining between them an annular sealing control chamber encompassing said passage, are inserted between the two linking parts.

9. A device as recited in claim 8, wherein the two concentric sealing devices inserted between the two linking parts comprise a toric seal inserted between two tubular sections of said parts, one being stored inside the other and delimiting said tubular sections and whose extremities are secured to each of the linking parts.

10. A device as recited in claim 1, wherein each linking part bears two concentric lip seals encompassing said passage and suitable for coming to take sealed support on one o: the flanges.

11. A device as recited in claim 9, wherein a sealing control conduit is formed inside each of the linking parts and opens between the lip seals.

12. A device as recited in claim 1, wherein a first door of each double door suitable for coming and being nested in one of the linking parts includes an exterior peripheral edge having three adjacent throats, the second door of each double door suitable for coming and being nested inside one of the flanges comprising an exterior peripheral edge having another throat, a toric seal being suitable for rolling between the two throats of the first door furthest from the second door under the effect of its cooperation with an interior cylindrical surface of the linking part, and a toric flange formed at an extremity of a skirt encompassing the peripheral edge of the second door and secured to the latter by its opposite extremity being suitable for rolling between the throat of the first door nearest the second door and the throat of the second door under the effect of its cooperation with an interior cylindrical surface of the flange.

13. A device as recited in claim 1, wherein each of the doors is provided with a lip seal on its outer peripheral surface, one of the doors of each double door comprising a ring seal at the periphery of the face of this door turned towards the other door.

14. A device as recited in claim 1, wherein each of the doors is provided with a lip seal on its outer peripheral surface, the device also comprising, for each double door, a sealing flange suitable for- being wound onto the adjacent sections of the peripheral surfaces of the doors.

* * * * *